United States Patent
Peters et al.

(10) Patent No.: US 10,702,942 B2
(45) Date of Patent: Jul. 7, 2020

(54) HEAT MANIPULATION AND SEAM TRACKING OF WEAVED WELDS

(71) Applicant: Lincoln Global, Inc., Santa Fe Springs, CA (US)

(72) Inventors: Steven R. Peters, Huntsburg, OH (US); John Benjamin Schaeffer, Rocky River, OH (US); David A. Fink, University Heights, OH (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 636 days.

(21) Appl. No.: 15/474,411

(22) Filed: Mar. 30, 2017

(65) Prior Publication Data

US 2018/0281094 A1     Oct. 4, 2018

(51) Int. Cl.
*B23K 9/02* (2006.01)
*B23K 9/095* (2006.01)
(Continued)

(52) U.S. Cl.
CPC ............ *B23K 9/0216* (2013.01); *B23K 9/092* (2013.01); *B23K 9/0953* (2013.01); *B23K 9/127* (2013.01)

(58) Field of Classification Search
None
See application file for complete search history.

(56) References Cited

U.S. PATENT DOCUMENTS 4,092,517 A   5/1978   Woodacre
4,366,362 A   12/1982  Ohta
(Continued)

FOREIGN PATENT DOCUMENTS

EP    0338078 B1    5/1992
JP    H0284270 A    3/1990
(Continued)

OTHER PUBLICATIONS

Maeda et al., Development of Adaptive Control of Arc Welding by Image Processing, 2000, NIST Special Publication 949, Ninth International Conference on Computer Technology in Welding, p. 327-336. Available at: https://nvlpubs.nist.gov/nistpubs/Legacy/SP/nistspecialpublication949.pdf. (Year: 2000).*

(Continued)

*Primary Examiner* — Ibrahime A Abraham
*Assistant Examiner* — Elizabeth M Sims
(74) *Attorney, Agent, or Firm* — Brad C. Spencer

(57) ABSTRACT

An arc welder produces a weave pattern between workpieces. Each weld run comprises a center portion including a joining region between the workpieces and edge regions spaced apart from the joining region. The welder includes a power source that provides a welding waveform to a welding electrode to generate an arc to achieve a desired heat for welding, a welding torch, and an oscillator for oscillating the torch between the welding edge regions. A controller causes the power source to operate in a first mode utilizing a first waveform during welding within the joining region, and in a second mode using a second waveform, having a greater positive component than the first waveform, during welding within the edge regions. The controller determines a stickout value based on the first waveform but not the second waveform, and performs seam tracking based the second waveform but not the first waveform.

8 Claims, 5 Drawing Sheets

(51) Int. Cl.
  *B23K 9/127*  (2006.01)
  *B23K 9/09*   (2006.01)

(56) References Cited

U.S. PATENT DOCUMENTS

| | | | |
|---|---|---|---|
| 4,556,777 A * | 12/1985 | Sarugaku | B23K 9/127 |
| | | | 219/124.34 |
| 5,281,791 A * | 1/1994 | Tabata | B23K 9/0732 |
| | | | 219/130.33 |
| 7,397,015 B2 | 7/2008 | Peters | |
| 8,809,739 B2 | 8/2014 | Peters | |
| 8,941,031 B2 | 1/2015 | Behmlander | |
| 2007/0170164 A1 | 7/2007 | Nadzam | |
| 2008/0053978 A1 | 3/2008 | Peters | |
| 2013/0175247 A1* | 7/2013 | Peters | B23K 9/025 |
| | | | 219/125.12 |
| 2014/0001166 A1 | 1/2014 | Peters et al. | |
| 2014/0021182 A1 | 1/2014 | Peters | |
| 2014/0263239 A1 | 9/2014 | Peters | |
| 2014/0374391 A1 | 12/2014 | Cole | |
| 2016/0067808 A1 | 3/2016 | Peters | |

FOREIGN PATENT DOCUMENTS

| | | |
|---|---|---|
| JP | 2001198675 A | 7/2001 |
| JP | 2007090417 A | 4/2007 |
| KR | 2000031054 A | 6/2000 |

OTHER PUBLICATIONS

Extended European Search Report from Corresponding Application No. 18165106.8; dated Sep. 12, 2018; pp. 1-7.

X.D. Gao et al.—"Detection of Weld Position and Seam Tracking Based on Kalman Filtering of Weld Pool Images" (www.sciencedirect.com/science/article/pii/S0278612506000021) Journal of Manufacturing Systems, vol. 24, Iss. 1, 2005, pp. 1-12 (12 pages).

* cited by examiner

HEAT MANIPULATION AND SEAM TRACKING OF WEAVED WELDS

BACKGROUND OF THE INVENTION

1. Field of the Invention

This application relates generally to a method and apparatus for conducting electric arc welding and, more particularly, to a novel method and welder that controls heat during a welding operation to produce a weave pattern using positional heat control.

2. Description of Related Art

Electric arc welding is used in a wide variety of metal jointing and surfacing applications. In most welding applications, the electrode is manipulated with respect to the welded joint, in order to achieve a desired weld bead profile. For example, to spread out the weld bead the electrode can be weaved from side to side across the weld joint as it progresses along the length of the weld joint to manipulate the heat of the arc at different locations. To manipulate the heat, a maximum heat input level is often determined and then the appropriate welding waveform and parameters are selected for the weld. At locations such as the outermost lateral extent of the weld joint where the workpiece depth can tolerate high heat, the weaving movement of the electrode is temporarily paused to expose this portion of the workpiece to a high heat that increases penetration. At other locations such as the seam between two workpieces being welded together, the depth of the metal requires the electrode to remain in motion along the weaving path to avoid burning through the workpiece.

Rather than select a fixed heat input level, the position of the electrode can be tracked to achieve adequate temperature control based on location. But tracking the electrode position relative to the seam has conventionally been too noisy, and not responsive during arc welding operations involving pulsed and AC waveforms. As a result, conventional welding methods and apparatus have been unable to accurately determine when to change the welding parameters or the heat input during a welding process to account for different gap widths.

BRIEF SUMMARY OF THE INVENTION

Accordingly, there is a need in the art for a welder and method to accurately determine an average weld current or voltage during weave welding with multiple AC waveforms for heat control, so that various different welding parameters can be determined.

According to one aspect, the subject application involves an electric arc welder for producing a weave pattern along a weld seam between aligned workpieces with a succession of individual weld runs across the weld seam. Each run comprises a center portion including a joining region between the aligned workpieces and welding edge regions of each of the aligned workpieces spaced apart from the joining region. The welder includes a power source that provides a welding waveform to a welding electrode to generate an arc to achieve a desired heat for welding, a welding torch, and an oscillator configured to oscillate the welding torch to generate the weave pattern along the weld seam and between the welding edge regions. At least one controller causes the power source to operate in at least a first mode utilizing a first waveform during welding within the joining region, and in a second mode using a second waveform, having a greater positive component than the first waveform used in the first mode, during welding within the welding edge regions. The at least one controller determines a stickout value based on the first waveform used while welding in the joining region, but not the second waveform, and performs seam tracking of the weld seam based the second waveform used while welding in the welding edge regions, but not the first waveform.

According to another aspect, the subject application involves a method of controlling heat produced by an electric arc welder during production of a weave pattern along a weld seam between aligned workpieces with a succession of individual weld runs across the weld seam. Each run comprises a center portion including a joining region between transversely spaced edges of the aligned workpieces and welding edge regions of each of the aligned workpieces spaced apart from the joining region. The method includes oscillating a welding torch of the electric arc welder between the welding edge regions during arc welding. A welding waveform provided by a power source to a welding electrode of the welding torch is sensed. The method includes determining that the welding torch is adjacent to the joining region and providing a first AC waveform to the welding electrode, and determining that the welding torch is adjacent to a welding edge region and providing a second AC waveform to the welding electrode, wherein the second AC waveform has a greater positive component than the first AC waveform used when welding in the joining region. A stickout value is determined based on the first AC waveform used while welding in the joining region and excluding the second AC waveform. Seam tracking of the weld seam is performed based on the second AC waveform used while welding in the welding edge regions and excluding the first AC waveform.

According to one aspect, the subject application involves an electric arc welder for producing a weave pattern along a weld seam between aligned workpieces with a succession of individual weld runs across the weld seam, each run comprising a center portion including a joining region between the aligned workpieces and welding edge regions of each of the aligned workpieces spaced apart from the joining region. The welder comprises a power source that provides a welding waveform to a welding electrode to generate an arc to achieve a desired heat for welding, a welding torch, and an oscillator configured to oscillate the welding torch to generate the weave pattern along the weld seam and between the welding edge regions. At least one controller causes the power source to operate in at least a first mode utilizing a first AC waveform during welding within the joining region, and in a second mode using a second AC waveform, having a greater positive component than the first AC waveform used in the first mode, during welding within the welding edge regions. The at least one controller determines a first welding parameter based on the first AC waveform, used while welding in the joining region, but not based on the second AC waveform. The at least one controller determines a second welding parameter based the second AC waveform, used while welding in the welding edge regions, but not based on the first AC waveform.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF SEVERAL VIEWS OF THE DRAWING

The invention may take physical form in certain parts and arrangement of parts, embodiments of which will be described in detail in this specification and illustrated in the accompanying drawings which form a part hereof and wherein.

DETAILED DESCRIPTION OF THE INVENTION

Figure 1:
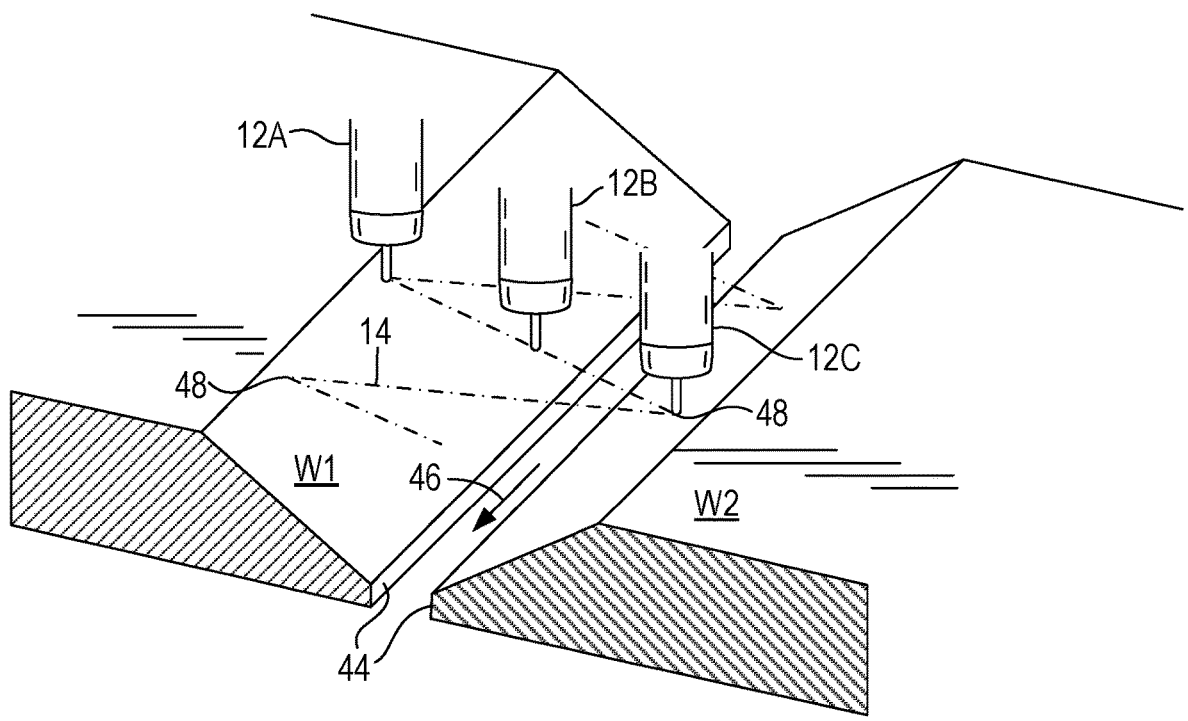
FIG. 1 shows an illustrative arrangement of a torch of an electric arc welder in use to weld an open root joint.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

Figure 3:
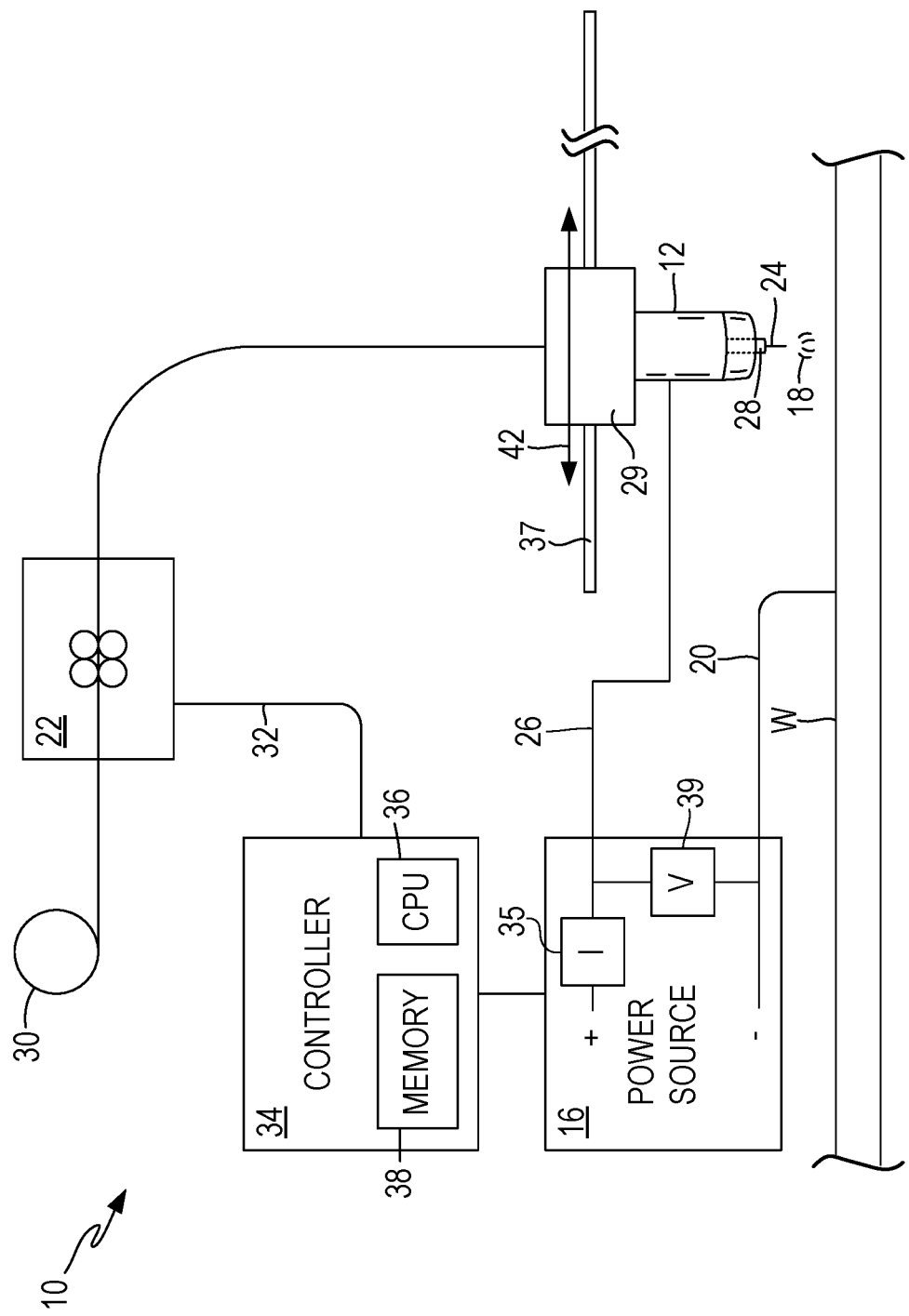
FIG. 3 is a schematic representation of an embodiment of an arc welder in accordance with the present disclosure.

FIG. 1 shows an illustrative embodiment of a torch 12 of an electric arc welder 10 (FIG. 3) in use to weld an open root joint (e.g., a narrow root opening that lacks backing). The torch 12 is referred to specifically at 12A, 12B, 12C at different locations along the weave pattern, represented by broken line 14 in FIG. 1, but is referred to generally herein as torch 12. To move the torch 12 transversely across the weld joint and along the length of the weld joint to establish the weave pattern, the torch 12 can be supported by an oscillator 29, as shown in FIG. 3. The oscillator 29 can be motorized to travel along a track 37 in the directions of arrows 42 defining the direction and extent of adjustment, adjustable along the track by a pneumatic or hydraulic actuator, electric motor, or any other suitable adjustment device. In certain embodiments, the oscillator 29 is a robotic arm holding the torch 12 to perform robotic welding. The illustrative arc welder 10 of FIG. 3 also includes a power source 16 that provides an electric welding current to be used to generate an arc 18 with enough heat to weld the workpieces W1, W2 (FIG. 1) together. The power source 16 can be of any known type which is capable of generating different welding waveform profiles and is capable of welding in both a DC+ and a DC− state. Further, exemplary embodiments of the power source 16 are types of power supplies that are capable of generating pulse-type welding, short arc, and/or surface tension transfer (STT) type welding waveforms. Specific examples of such power sources include, but are not limited to the Power Wave®, manufactured by The Lincoln Electric Company of Cleveland, Ohio.

Of course, embodiments of the present invention are not limited to this example, which is meant for illustrative purposes. As shown, a first terminal (−) of the power source 16 is coupled to the workpiece W in FIG. 3 via a lead 20 and a second terminal (+) is coupled via a lead 26 to a torch 12, which provides the welding waveform to a welding electrode 24 via a contact tip 28. The polarities of the terminals (−) and (+) can be as shown in the drawings, or optionally reversed as long as opposite polarities are established for the workpiece W and the electrode 24. The electrode 24 can be supplied to a wire feeder 22 by a spool 30 wound with a continuous filament of the electrode 24. An exemplary embodiment of the wire feeder 22 is a type that can quickly change the wire feed speed of the electrode 24 in response to command signals from the controller 34 as described herein.

A controller 34, powered by the power source 16 or a separate, relatively-low power control circuit supply is coupled to the wire feeder 22 to control the delivery of the electrode 24 during welding processes as described herein via a control link 32 (which can be wired or wireless). As such, embodiments of the controller 34 can include a computer processor 36 operatively connected to a non-transitory computer memory 38 (e.g., solid-state storage device, hard disk drive, etc.) storing computer-executable instructions that are executable by the computer processor 36. The controller 34 can optionally be integrated as part of the power source 16, a separate stand-alone component, or otherwise provided to the arc welder 10. Of course, alternate embodiments of the controller 34 can utilize analog and/or digital circuit components such as application specific integrated circuits, field gate arrays, and the like without departing from the scope of the present disclosure. A current sensor 35 is provide to the power supply 16 in FIG. 3 to sense the current drawn during the welding operation and transmit a signal indicative of the sensed current to the controller 34. According to alternate embodiments, however, the current sensor 35 can optionally form a portion of the controller 34 assembly, be formed as a discrete, stand-alone device, or otherwise provided to the arc welder 10 to sense the current drawn during welding. Similarly, a voltage sensor 39 senses the welding voltage between the electrode 24 and workpiece W and provides a voltage signal to the controller 34.

Figure 2:
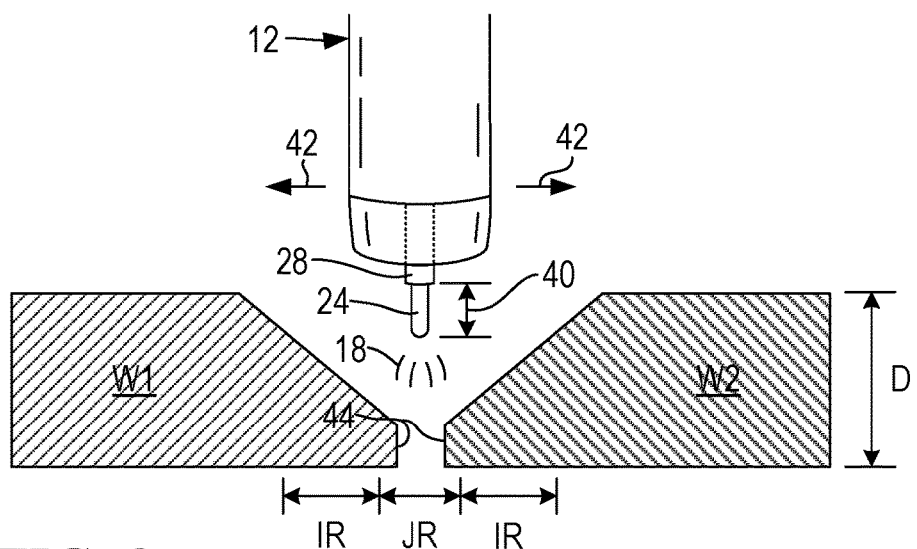
FIG. 2 shows a side view of a torch provided to an electric arc welder in use to weld an open root joint.

With reference to FIG. 2, an un-melted length of the electrode 24 extends a controlled distance, referred to herein as "stickout 40", from the end of the contact tip 28. The arc 18 generating the heat to weld the workpieces W1, W2 together is established between the distal tip of the electrode 24 and the workpiece to form a weld pool including molten metal and electrode material. The amount of stickout 40 affects the amperage drawn by the electrode 24, and accordingly, aspects of the resulting weld such as penetration. The stickout 40 can be determined based on the current being conducted through the electrode 24 during welding in the different regions of the workpieces W1, W2, since the current will vary as a function of the dimensions of the workpieces W1, W2 being welded. To accurately determine the stickout 40, however, different portions of the current waveform are analyzed while welding in the different regions, as explained in detail below. Further, the position of the torch 12 relative to the workpieces W1, W2 within the weave pattern can be monitored for seam tracking purposes using preferred portions of the current waveform for accuracy.

As will be discussed below, due to the varying thickness of the workpieces W1, W2 between the edges of the torch weave, different welding waveforms are used at the edges of the weave than the center because the workpieces are thin in the center. AC waveforms having a greater positive voltage/current component than negative are used at the edges of the weave to provide greater heat input and weld penetration. AC waveforms having a greater negative voltage/current component than positive are used at the center of the weave to provide greater metal deposition and less heat input. Since the AC waveforms at the edges of the weave have a greater positive voltage/current component than negative, the positive portion of monitored welding voltage and/or current is preferentially used for seam tracking, rather than the negative portion. As the torch is oscillated back and forth, the controller or oscillator knows when the torch is located in the center of the weave, and the AC waveforms having a greater negative voltage/current component than positive can be applied accordingly. Stickout can be calculated in the center of the weave. Since the AC waveforms in the center of the weave have a greater negative voltage/current component than positive, the negative portion of monitored welding voltage and/or current is preferentially used for calculating stickout in the center of the weave, rather than the positive portion. Thus, different welding waveforms can be provided at the edges and center of the weave, and different welding parameters determined or monitored in the different regions using different preferred portions of the welding waveforms. Using the different preferred portions of the welding waveforms as described helps to maximize the information provided by the waveforms, to improve the accuracy of the welding parameters determined from the waveforms.

The depth D of the workpieces W1, W2 affects the drawn current, in the dimension shown in FIG. 2, at the point of the weld where the arc is established. As the torch 12 is moved side-to-side in the directions generally indicated by arrows 42, the depth D of the respective workpiece over which the electrode 24 is situated during welding varies. For the exemplary joint in the form of an open root joint between the workpieces W1, W2 shown in FIGS. 1 and 2, opposing land surfaces 44 are brought to within close proximity to each other, optionally butting against each other. It is to be understood, however, that the present disclosure is not so limited. Instead, the present disclosure encompasses any joint to be welded in which the distance between the electrode and workpieces varies during movement of the welding torch (e.g., a Tee joint). For the sake of brevity and to clearly describe the present technology, the illustrative arrangement of the workpieces W1, W2 shown in the drawings will be described in detail below.

For the embodiment illustrated in FIGS. 1 and 2, the torch 12 progresses forward in the direction generally indicated by arrow 46 to generate the weld seam. As the torch 12 moves forward, it is repeatedly moved by the oscillator 29 across a joining region JR (FIG. 2), which includes the interface between the opposing land surfaces 44, where the depth D of the workpieces W1, W2 is relatively-shallow compared to the depth D of the workpieces W1, W2 at one or more inward regions IR, which are laterally spaced apart from a longitudinal axis of the joining region JR. The inward region IR of each workpiece W1, W2 has a distal boundary adjacent to the apex 48 of the weave pattern 14, where the torch 12 changes direction to again move toward the opposite workpiece, and a proximate boundary between the apex 48 and the respective land surface 44 of the workpieces W1, W2. To create the weave pattern 14, the torch 12 is moved by the oscillator 29 from the torch location 12A at the apex 48 above the workpiece W1 in FIG. 1, towards the joining region JR as represented by torch location 12B, before crossing the interface or gap between the land surfaces 44 and approaching the apex 48 of the weave pattern 14, represented by torch location 12C. Of course, any pattern other than a weave that will cover variable workpiece depths and arrangements where a plurality of different heat levels is desired is also encompassed by the scope of the present disclosure.

During welding, the exemplary system shown in FIG. 3 is capable of changing between two or more different welding processes involving different current waveforms based on the position of the torch 12 along the weave. For example, the present arc welder 10 can optionally change from a relatively-high heat input welding process performed within the one or more inward regions IR (interchangeably referred to as "edge regions" where the edge of the weld occurs before the torch 12 is alternated in the opposite lateral direction), where the depth D is relatively deep, to a low heat welding operation within the joining region JR, where the depth D is relatively shallow in comparison to the depth D of the inward regions IR. The location of the torch 12 and electrode 24 relative to the workpiece W and along the weld seam can be tracked by sensing any suitable parameter with a value that varies to coincide with location. For instance, the current sensor 35 can monitor the current drawn to establish the arc 18. The sensed current will change at a distinctive rate at the gap between the land surfaces 44, indicating that the electrode 24 is located at the interface between the workpieces W1, W2. Similarly, the current draw will increase above a threshold value as the electrode moves from the joining region JR to an inward region IR. Thus, movement of the electrode 24 between regions in which high heat is desirable to achieve a desired penetration at the toes of the weld and regions in which low heat is desirable to avoid burning through the joint can be tracked based, at least in part, on the sensed current draw. Although sensing the current draw is described in the illustrative embodiments herein, other embodiments can sense or otherwise monitor any parameter that is indicative of a condition that warrants changing between high and low heat welding operations, and initiate a transition between these welding operations in response thereto. Further, as the torch is oscillated back and forth, the controller or oscillator can know when the torch is located in the center of the weave and when the torch is located toward the edges of the weave without referring to a sensed parameter, such as current.

Figure 4:
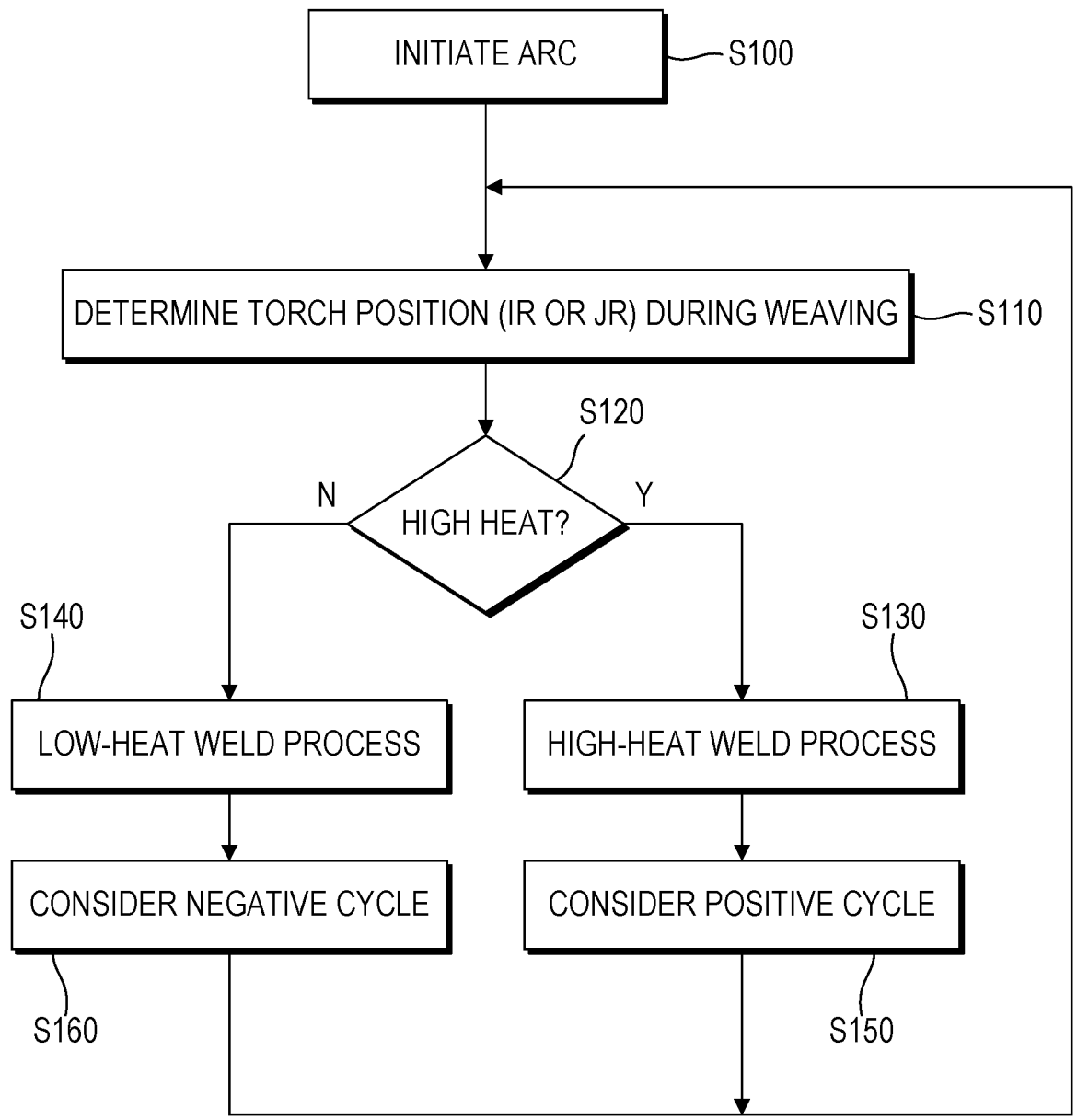
FIG. 4 is a flow diagram schematically illustrating a method of controlling heat produced by an electric arc welder during two different weld processes to produce a weave pattern.
Figure 5:
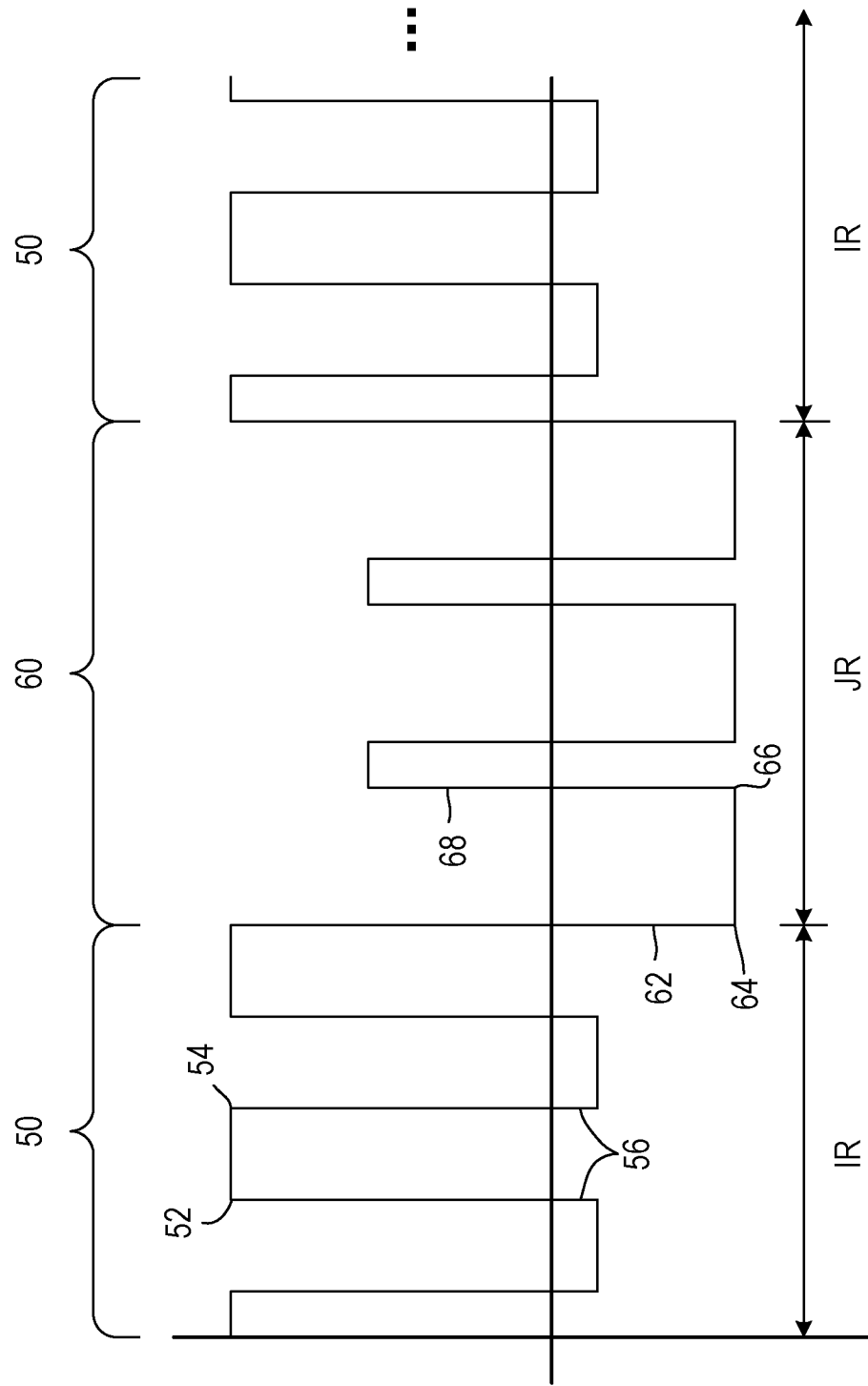
FIG. 5 is an illustrative embodiment of a current waveform conducted through an electrode during two different AC SAW welding processes.
Figure 6:
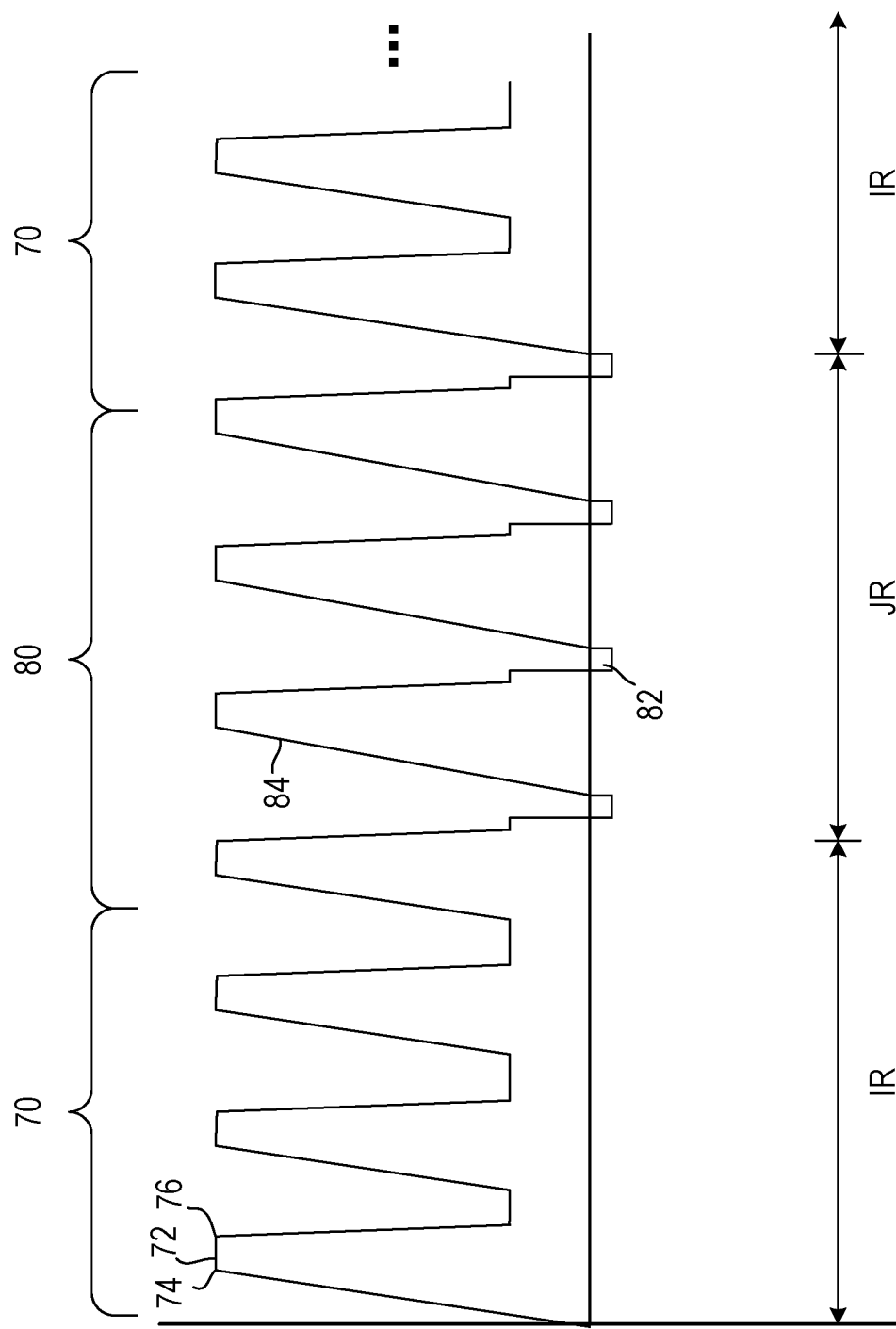
FIG. 6 is an illustrative embodiment of a current waveform conducted through an electrode during two different AC GMAW welding processes.

An illustrative method of controlling heat produced by an electric arc welder 10 during production of a weave pattern 14 along a weld seam between aligned workpieces W1, W2 is graphically depicted in the flow diagram of FIG. 4. Illustrative examples of the waveforms supplied to the electrode 24 during welding in the various different regions for AC submerged arc welding ("SAW") and AC gas metal arc welding ("GMAW") are shown in FIGS. 5 and 6, respectively. At step S100, the power supply 16 supplies an electric current to the electrode 24 to establish the arc 18 between the electrode 24, e.g., at electrode position 12A in FIG. 1. Position of the torch within the weave pattern (e.g., inward region IR or joining region JR) is determined at step S110. Position of the torch can be determined by the oscillator or controller directly, as the movements of the torch are controlled, or determined from a monitored parameter, such as current or voltage. Based on the position of the torch within the weave pattern, it is determined at step S120 whether a high-heat or low-heat weld process is appropriate for the current location of the electrode 24. For the present example, it is determined at step S120 that welding at torch location 12A (FIG. 1) within an inward region IR of the workpiece W1 that calls for a high heat current waveform to be supplied to the electrode 24 at step S130. An example of a high-heat current waveform 50 for AC SAW welding within the inward region IR is shown in FIG. 5. The high-heat current waveform 50 is delivered during a weld process conducted within the inward region IR during movement from torch position 12A toward torch position 12B. During welding in the inward region IR, a portion, but less than the entire high-heat current waveform 50 is selected at step S150 to be monitored, sampled or generally considered and factored into a determination of the average or instantaneous current, voltage, power, etc. supplied during the high-heat welding process in the inward region IR, to determine a parameter such as the location of the torch during seam tracking, the stickout 40, and the like. For example, one portion of the high-heat current waveform can be weighted more heavily or otherwise more prominently considered in the calculation than one or more other portions depending on the region (e.g., inward region IR or joining region JR) in which welding is being performed. This weighting can optionally include entirely excluding (e.g., assigning a weighting factor of zero (0.0) to) a portion of the high-heat current waveform. For the specific example shown in FIG. 5, the rising edge 52 and/or the falling edge 54 of square-wave pulses and/or other parameters such as the positive magnitude of the pulse can be detected during the positive cycle of the waveform 50 to evaluate the pulse width or otherwise calculate the average or other measure of current supplied to the electrode 24 during welding in the inward region IR. For embodiments that involve detecting both the rising and falling edges at the peak or elsewhere within the positive portion of the waveform, or detect the maximum positive amplitude of the pulse, the negative portion 56 of the waveform (e.g., that portion vertically below the horizontal axis in FIG. 5) can be excluded from consideration altogether, or at least considered to a lesser extent than the positive portion of the high-heat current waveform 50. The primary portion of any waveform to be factored into the calculation of welding current/voltage for determining torch position during seam tracking or the stickout 40 while welding in the associated region is referred to hereinafter as the Selected Portion. During each of the welding processes described herein, the electrode 24 is fed by the wire feeder 22 at a wire feed speed which corresponds to the welding operation ongoing.

Unless the weld process is interrupted or completed, the method returns to step S110 to determine torch position based on location within the weave pattern. As the torch 12 is moved toward the torch position 12B it crosses the boundary separating the inward region IR from the joining region JR of the workpiece W1, and eventually the interface or gap between the two workpieces W1, W2. Based on the position of the torch 12 established by the oscillator 29 within the joining region JR, at step S120 the controller 34 determines a low-heat input weld process is to be performed, and controls the delivery of electric current from the power source 16 to initiate such a weld process at step S140. The negative portion of the waveform is also established by the controller 34 as the portion of waveform to be primarily considered to determine the average current at step S160. In other words, the negative portion of the waveform is included in the Selected Portion during welding in the joining region JR. Stickout can be calculated when welding in the joining region JR based on the Selected Portion of the waveform used during the low-heat input weld process.

FIG. 5 also provides an illustrative example of a low-heat current waveform 60 supplied during the low-heat weld process for AC SAW welding within the joining region JR. The low-heat current waveform 60 has less of a positive component than the high-heat current waveform 50. In other words, at least one of the pulse width, the positive pulse magnitude, positive (e.g., above the horizontal axis) area under the waveform, and any other measure for the low-heat current waveform 60 is less than a corresponding value of the high-heat current waveform 50 so less heat is supplied to the workpieces during welding in the joining region JR (e.g., to avoid burn through). Similar to the high-heat weld process, a portion, but less than all of the low-heat current waveform 60 is primarily considered to calculate the average current (or voltage) supplied to the electrode 24. However, unlike during the high-heat weld process, the negative portions 62 of the low-heat current waveform 60 are primarily considered, and optionally the only consideration to the exclusion of the positive portions, to determine the current (or voltage) being supplied to the electrode 24 for determining the stickout 40 within the joining region JR. Being primarily considered or otherwise factored into the determination of the average current, at least one negative portion of the low-heat current waveform 60 can be weighted more heavily or more prominently considered in the calculation than one or more other portions depending on the region (e.g., inward region IR or joining region JR) in which welding is being performed. This weighting can optionally involve entirely excluding (e.g., assigning a weighting factor of zero (0.0) to) a portion of the low-heat current waveform 60. For the specific example shown in FIG. 5, the falling edge 64 and/or the rising edge 66 of square-wave pulses can be detected during the negative cycle of those pulses to evaluate factors such as at the magnitude of the pulse, to evaluate the pulse width or otherwise calculate the average current supplied to the electrode 24 during welding in the inward region IR. For embodiments that involve detecting both the falling and rising edges 64, 66 at the peak or elsewhere within the negative portion 62 of the waveform 60, or detect the maximum positive amplitude of the pulse, the positive portion 68 of the waveform 60 (e.g., that portion vertically above the horizontal axis in FIG. 5) can be excluded from consideration altogether, or at least considered to a lesser extent than the negative portion 62 of the waveform 60.

As shown in FIG. 5, the controller 34 resumes the high-heat weld process after the torch 12 moves back to the opposite inward region IR after exiting the joining region JR during formation of the weave pattern. The path traveled by the torch 12 to create the weave pattern can be a predetermined path programmed or otherwise input to the oscillator 29 or controller 34, and the controller 34 can primarily, or only consider the Selected Portion of the waveform in the respective regions to determine the stickout 40 or perform seam tracking within the different welding regions. During seam tracking, the controller 34 or oscillator 29 can confirm the location where the torch 12 is to change direction at the outermost lateral positions and again travel toward the joining region JR to create the weave pattern. Thus, if the weld seam path along which the torch 12 travels begins to drift or otherwise deviate from an intended path of the weave pattern, the torch can continue to follow the deviated weld seam.

Although the example waveforms appearing in FIG. 5 are for AC SAW welding, the present application is not so limited. The apparatus and method described herein are useful for any arc welder and welding method where switching between high and low heat weld processes on-the-fly based on the geometry and/or other physical characteristics of the workpiece is appropriate. As another example, FIG. 6 shows AC current waveforms to be supplied to an electrode 24 for AC GMAW welding. The high-heat current waveform shown in FIG. 6 lacks a negative component, so the peak portions 72 can be primarily considered and used to calculate the average current, and the bottom half, or local minima, or other "lower" portions of the waveform 70 can optionally be excluded from the calculation of the average current, or afforded or assigned a lesser weight than the peak portions 72, which are the Selected Portions, in the present example.

Similar to the description above, the high-heat current waveform 70 is delivered during a high-heat weld process conducted within the inward region IR during movement from torch position 12A toward torch position 12B. While welding in the inward region IR, the Selected Portion, but less than the entire high-heat current waveform 70 is selected at step S150 to be monitored, sampled or generally considered and factored into a determination of the average current supplied during the high-heat welding process in the inward region IR. The Selected Portion of the high-heat current waveform can be weighted more heavily or more prominently considered in the calculation than one or more other portions depending on the region (e.g., inward region IR or joining region JR) in which welding is being performed similar to the description above. But since the waveform 70 lacks a negative component, the bottom half, or local minima, or other "lower" portions of the waveform 70 can optionally be excluded from the calculation of the average current, or afforded a lesser weight than the peak portions 72, which are the Selected Portions, in the present calculation.

FIG. 6 also provides an illustrative example of a low-heat current waveform 80 supplied during the low-heat weld process for AC GMAW welding within the joining region JR. The low-heat current waveform 80 has approximately the same positive component 84 as the high-heat current waveform 70, but the controller 34 added a negative component 82 that is absent from the high-heat current waveform 70. Again, a portion, but less than all of the low-heat current waveform 80 is primarily considered as the Selected Portion in calculating the average current supplied to the electrode 24. That Selected Portion can include the negative component 82 of the low-heat current waveform 80, and can exclude other portions 84 from the calculation of the average current.

Regardless of the portions of a monitored waveform that are considered to calculate the average current or voltage, the average current or voltage can be used to estimate the stickout 40 at various locations along the weld seam and to further assist in tracking the weld, or be used to determine other welding parameters. As discussed above, different welding waveforms can be provided at the edges and center of the weave, and different welding parameters (e.g., stickout, torch location or weave edge detection, etc.) determined or monitored in the different regions using different preferred portions of the welding waveforms.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An electric arc welder for producing a weave pattern along a weld seam between aligned workpieces with a succession of individual weld runs across the weld seam, each run comprising a center portion including a joining region between the aligned workpieces and welding edge regions of each of the aligned workpieces spaced apart from the joining region, the welder comprising:
   a power source that provides a welding waveform to a welding electrode to generate an arc to achieve a desired heat for welding;
   a welding torch;
   an oscillator configured to oscillate the welding torch to generate the weave pattern along the weld seam and between the welding edge regions; and
   at least one controller that causes the power source to operate in at least a first mode utilizing a first portion of the welding waveform during welding within the joining region, and in a second mode using a second portion of the welding waveform, having a greater positive component than the first portion of the welding waveform used in the first mode, during welding within the welding edge regions, wherein the first portion of the welding waveform has both a positive and a negative component,
   wherein the at least one controller determines a stickout value based on the first portion of the welding waveform used while welding in the joining region but not the second portion of the welding waveform, and performs seam tracking of the weld seam based on the second portion of the welding waveform used while welding in the welding edge regions but not the first portion of the welding waveform,
   wherein the at least one controller is configured to determine the stickout value by affording greater weight to all of the negative component of the first portion of the welding waveform relative to weight afforded to all of the positive component of the first portion of the welding waveform.

2. The electric arc welder of claim 1, wherein the at least one controller is configured to perform seam tracking during welding in the second mode by affording a greater weight to a positive component of the second portion of the welding waveform relative to a weight afforded a negative component of the second portion of the welding waveform.

3. The electric arc welder of claim 2, wherein the at least one controller is configured to exclude the negative component of the second portion of the welding waveform when determining edges of the weave pattern when seam tracking during welding in the second mode, and factor only the positive component of the second portion of the welding waveform when determining edges of the weave pattern.

4. The electric arc welder of claim 2, wherein an average current of the positive component of the second portion of the welding waveform provided by the power source during welding in the second mode is greater than the average current of the positive component of the first portion of the welding waveform provided by the power source during welding in the first mode.

5. The electric arc welder of claim 1, wherein the at least one controller is configured to exclude all of the positive component of the first portion of the welding waveform from the stickout value determination during welding in the first mode, and factor only the negative component of the first portion of the welding waveform into the determination of the stickout value.

6. An electric arc welder for producing a weave pattern along a weld seam between aligned workpieces with a succession of individual weld runs across the weld seam, each run comprising a center portion including a joining region between the aligned workpieces and welding edge regions of each of the aligned workpieces spaced apart from the joining region, the welder comprising:
- a power source that provides an AC welding waveform to a welding electrode to generate an arc to achieve a desired heat for welding during a submerged arc welding operation;
- a welding torch;
- an oscillator configured to oscillate the welding torch to generate the weave pattern along the weld seam and between the welding edge regions; and
- at least one controller that causes the power source to operate in at least a first mode utilizing a first portion of the AC welding waveform during welding within the joining region, and in a second mode using a second portion of the AC welding waveform, having a greater positive component than the first portion of the AC welding waveform used in the first mode, during welding within the welding edge regions, wherein both of the first portion of the AC welding waveform and the second portion of the AC welding waveform have a positive and a negative component,
- wherein the at least one controller determines a stickout value based on the first portion of the AC welding waveform, used while welding in the joining region, but not based on the second portion of the AC welding waveform,
- wherein the at least one controller determines torch location for seam tracking of the weld seam based the second portion of the AC welding waveform, used while welding in the welding edge regions, but not based on the first portion of the AC welding waveform,
- wherein the at least one controller is configured to perform seam tracking by affording greater weight to all of the positive component of the second portion of the AC welding waveform relative to weight afforded to all of the negative component of the second portion of the AC welding waveform, and
- wherein the at least one controller is configured to determine the stickout value by affording greater weight to all of the negative component of the first portion of the AC welding waveform relative to weight afforded to all of the positive component of the first portion of the AC welding waveform.

7. The electric arc welder of claim 6, wherein the at least one controller is configured to exclude all of the negative component of the second portion of the AC welding waveform when determining edges of the weave pattern when seam tracking during welding in the second mode, and factor only the positive component of the second portion of the AC welding waveform when determining edges of the weave pattern.

8. The electric arc welder of claim 6, wherein the at least one controller is configured to exclude all of the positive component of the first portion of the AC welding waveform from the stickout value determination during welding in the first mode, and consider only the negative component of the first portion of the AC welding waveform to determine the stickout value.

* * * * *